(12) United States Patent
Teboulle

(10) Patent No.: US 11,346,694 B2
(45) Date of Patent: May 31, 2022

(54) METHOD FOR MEASURING THE VELOCITY OF A FLUID USING ULTRASOUND

(71) Applicant: SAGEMCOM ENERGY & TELECOM SAS, Rueil Malmaison (FR)

(72) Inventor: Henri Teboulle, Rueil Malmaison (FR)

(73) Assignee: Sagemcom Energy & Telecom SAS, Rueil-Malmaison (FR)

( * ) Notice: Subject to any disclaimer, the term of this patent is extended or adjusted under 35 U.S.C. 154(b) by 78 days.

(21) Appl. No.: 16/910,888

(22) Filed: Jun. 24, 2020

(65) Prior Publication Data

US 2020/0408578 A1 Dec. 31, 2020

(30) Foreign Application Priority Data

Jun. 28, 2019 (FR) ...................................... 1907189

(51) Int. Cl.
| | |
|---|---|
| *G01F 1/66* | (2022.01) |
| *G01N 29/44* | (2006.01) |
| *G01N 29/024* | (2006.01) |
| *G01N 29/34* | (2006.01) |
| *G01N 29/22* | (2006.01) |

(52) U.S. Cl.
CPC ............... *G01F 1/66* (2013.01); *G01F 1/662* (2013.01); *G01N 29/024* (2013.01); *G01N 29/343* (2013.01); *G01N 29/44* (2013.01); *G01N 29/4454* (2013.01); *G01N 29/222* (2013.01)

(58) Field of Classification Search
CPC ......... G01F 1/662; G01F 1/66; G01N 29/024; G01N 29/343; G01N 29/44; G01N 29/4454; G01N 29/222; G01P 5/245
See application file for complete search history.

(56) References Cited

U.S. PATENT DOCUMENTS

| | | | | |
|---|---|---|---|---|
| 5,983,730 | A * | 11/1999 | Freund | ...................... G01F 1/66 73/861.27 |
| 2010/0037673 | A1* | 2/2010 | Wicht | ................. G01F 25/0061 73/1.73 |
| 2019/0089306 | A1* | 3/2019 | Khoury | .................. H03D 3/009 |

* cited by examiner

*Primary Examiner* — Benjamin R Schmitt
(74) *Attorney, Agent, or Firm* — Muncy, Geissler, Olds & Lowe, P.C.

(57) ABSTRACT

A method for measuring a velocity of a fluid, comprising the steps of, acquiring an ultrasonic measuring signal after it has travelled in the fluid over a path of defined length; defining measurement zone of the ultrasonic measuring signal which includes a plurality of measurement lobes; for each measurement lobe, measuring a zero crossing point associated with said measurement lobe; selecting at least two zero crossing points which satisfy a predefined precision criterion; estimating a time of flight for the ultrasonic measuring signal from the selected zero crossing points; utilizing the time of flight to estimate the velocity of the fluid.

9 Claims, 3 Drawing Sheets

METHOD FOR MEASURING THE VELOCITY OF A FLUID USING ULTRASOUND

The invention relates to the field of ultrasonic flow meters.

BACKGROUND OF THE INVENTION

Conventionally, an ultrasonic flow meter uses a device for measuring the velocity of fluid by emitting and receiving ultrasonic measuring signals in order to measure the flow rate of a fluid moving in a pipe.

The measuring device comprises a conduit connected to the pipe in which the fluid moves. In order to measure the velocity of the fluid, ultrasonic measuring signals are emitted into the conduit which travel over a path of defined length, the travel times taken for the ultrasonic measuring signals to traverse the path of defined length from upstream to downstream and from downstream to upstream are measured, and the velocity of the fluid is estimated, in particular from the defined length and from the difference between the travel times.

A measuring device 1 of this type, occasionally known as a classical pipe, can be seen in FIG. 1. The measuring device 1 comprises a first transducer 2a, a second transducer 2b, and a measuring module 3 connected to the first transducer 2a and to the second transducer 2b.

The first transducer 2a and the second transducer 2b are paired as regards frequency and emission level. The first transducer 2a and the second transducer 2b are piezoelectric transducers, for example.

Thus, the path of defined length in this case is a rectilinear path with length L between the first transducer 2a and the second transducer 2b.

The measuring module 3 produces an electrical excitation signal 4 which is applied to the input of the first transducer 2a.

From the electrical excitation signal 4, the first transducer 2a emits an emitted ultrasonic measuring signal 5. The second transducer 2b receives a received ultrasonic measuring signal 6 resulting from propagation of the emitted ultrasonic measuring signal 5 in the fluid.

The measuring module 3 measures the travel time taken by the emitted ultrasonic measuring signal 5 to traverse the path of defined length from upstream to downstream.

The measuring module 3 in fact measures an overall transit time $T_{AB}$ from the first transducer 2a to the second transducer 2b.

The overall transit time $T_{AB}$ is such that:

$$T_{AB}=TA_A+\text{ToF}_{AB}+TR_B, \text{ in which:}$$

$TA_A$ is an activation time for the first transducer 2a;

$\text{ToF}_{AB}$ corresponds to the time of flight, the time taken for the emitted ultrasonic measuring signal 5 to traverse the path of defined length between the first transducer 2a and the second transducer 2b;

$TR_B$ is a reception time for the second transducer 2b.

Similarly, the second transducer 2b emits an ultrasonic measuring signal which is received by the first transducer 2a.

The measuring module 3 measures the overall transit time $T_{BA}$ which is such that:

$$T_{BA}=TA_B+\text{ToF}_{BA}+TR_A, \text{ in which:}$$

$TA_B$ is an activation time for the second transducer 2b;

$\text{ToF}_{BA}$ corresponds to the time of flight, the time taken for the ultrasonic measuring signal to traverse the path of defined length between the second transducer 2b and the first transducer 2a;

$TR_A$ is a reception time for the first transducer 2a.

Assuming that:

$TA_A=TA_B$ and $TR_A=TR_B$ (paired transducers), we obtain:

$$\Delta T=T_{BA}-T_{AB}=\text{ToF}_{BA}-\text{ToF}_{AB}=\text{DToF},$$

in which DToF is the differential time of flight.

In fact, the DToF is proportional to the mean velocity $\overline{V}$ of the fluid, and the measuring module 3 then calculates the mean velocity $\overline{V}$ of the fluid by using the formula:

$$\text{DToF}=2L\cdot\overline{V}/(C^2-\overline{V}^2),$$

in which C is the velocity of an ultrasonic wave in the fluid. As an example, the velocity of an ultrasonic wave in water is equal to approximately 1500 m/s, and is dependent upon the temperature of the water.

The measuring module 3 then deduces the mean velocity $\overline{V}$, together with its sign, of the flow of fluid moving in the pipe.

Certain phenomena due to the fluid dynamics in the conduit through which the fluid passes can result in perturbations which could destroy the measurements. As an example, air bubbles in the fluid could falsify a measurement because the velocity of sound in water is of the order of 1500 m/s, while the velocity of sound in air is approximately 4.4 times lower (it is equal to 340 m/s). In the absence of air bubbles, other perturbations such as vortices can also generate noise and falsify the measurements.

One known method for estimating the time of flight consists of defining the envelope of the received ultrasonic measuring signal, comparing this envelope with a predefined amplitude threshold, and taking into account the time at which the envelope reaches said predefined amplitude threshold. This method is simple to carry out, but suffers from two major disadvantages.

The determination of the peak of each pseudo-sinusoidal lobe utilises a sinusoidal interpolation over the peaks of the lobes. However, in general, sinusoidal interpolation is less precise as regards the determination of the instantaneous point of the maximum (peak) of a lobe.

In addition, the principle per se of using a comparison with a threshold in order to determine an instantaneous point is imprecise. In some cases though, the precision required for the velocity of the fluid necessitates a determination of a time of flight with an accuracy of the order of about ten ps.

AIM OF THE INVENTION

The aim of the invention is to improve the precision of the flow rate measurements carried out by an ultrasonic flow meter and to reduce the electricity consumption of said meter.

SUMMARY OF THE INVENTION

With a view to achieving this aim, a method is proposed for measuring a velocity of a fluid, comprising the steps of:

acquiring an ultrasonic measuring signal after it has travelled in the fluid over a path of defined length;

defining measurement zone of the ultrasonic measuring signal which includes a plurality of measurement lobes;

for each measurement lobe, measuring a zero crossing point associated with said measurement lobe;

selecting at least two zero crossing points which satisfy a predefined precision criterion;

estimating a time of flight for the ultrasonic measuring signal from the selected zero crossing points;

utilizing the time of flight to estimate the velocity of the fluid.

Thus, the time of flight of the ultrasonic measuring signal is estimated from the selected zero crossing points which satisfy the predefined precision criterion. This therefore eliminates zero crossing point measurements which are abnormal because they have been disrupted by noise of any nature, and only undisrupted zero crossing point measurements are preserved. This therefore carries out non-linear filtering, which significantly improves the precision of the measurement.

All (or nearly all) of the acquired ultrasonic measuring signals can therefore be used, because imprecise zero crossing points are eliminated and only precise zero crossing points are selected. Thus, the precise and pertinent measurement samples are extracted from each ultrasonic measuring signal and the others are eliminated so that, in order to exploit an ultrasonic measuring signal, it is not necessary for all of the measurement samples to be completely precise over the entire ultrasonic measuring signal.

Thus, it is not necessary to emit numerous repeated ultrasonic measuring signals in order to obtain precise measurements. The selection which is carried out can therefore avoid repeatedly emitting ultrasonic measuring signals for no purpose, which means that the electricity consumption of a meter in which the measuring method in accordance with the invention is being carried out can be reduced.

In addition, a measuring method as just described above is provided, in which the selected zero crossing points are successive zero crossing points which are associated with successive measurement lobes.

In addition, a measuring method as just described above is provided, in which the predefined precision criterion utilizes a value for a ratio between a difference between two successive zero crossing points and between a period of an electrical excitation signal used to generate the ultrasonic measuring signal.

In addition, a measuring method as just described above is provided, in which the selection step comprises the steps of:

for k=1 to N−1, calculating the values $R_k$ which are defined by:

$R_k = (t_{k+1} - t_k)/Tus$, $t_k$ being the zero crossing points for the measurement zone (21), and Tus being the period of the electrical excitation signal (18);

when a pair $C_i = (R_i, R_{i+1})$ is such that:

$R_i \in [(100-\alpha)\%;(100+\alpha)\%]$ and $R_{i+1} \in [(100-\alpha)\%;(100+\alpha)\%]$, in which α is a predefined precision threshold, selecting the zero crossing points $t_i$, $t_{i+1}$ and $t_{i+2}$.

In addition, a measuring method as just described above is provided, in which the selection step further comprises the steps of:

defining variables $a_k$, k varying from 1 to N;

initializing each variable $a_k$ to 0;

giving the value 1 to each variable $a_i$ when the zero crossing point $t_i$ is selected;

evaluating the time of flight from the formula:

$$ToF_{AB} = \frac{1}{N_t} \cdot \sum_{k=1}^{k=N} a_k \cdot (t_k - (k-1) \cdot T_{us}),$$

$N_t$ being the number of selected zero crossing points.

In addition, a measuring method as just described above is provided, in which the ultrasonic measuring signal comprises, in succession, a preliminary zone, the measurement zone and a final zone, the preliminary zone and the final zone not being taken into account in order to carry out the measurement of the velocity of the fluid.

In addition, an ultrasonic flow meter is provided which comprises a first transducer, a second transducer and a measuring module connected to the first transducer and to the second transducer, the ultrasonic flow meter being configured to carry out the measuring method which has just been described.

In addition, a computer program is provided which comprises instructions for executing, by means of a microcontroller of an ultrasonic flow meter, the measuring method which has just been described.

Storage means are also provided, characterized in that they store a computer program which comprises instructions for executing, by means of a microcontroller of an ultrasonic flow meter, the measuring method which has just been described.

The invention will be better understood in the light of the description below of a particular non-limiting embodiment of the invention.

BRIEF DESCRIPTION OF THE DRAWINGS

Reference will be made to the accompanying drawings, in which.

DETAILED DESCRIPTION OF THE INVENTION

Figure 1:
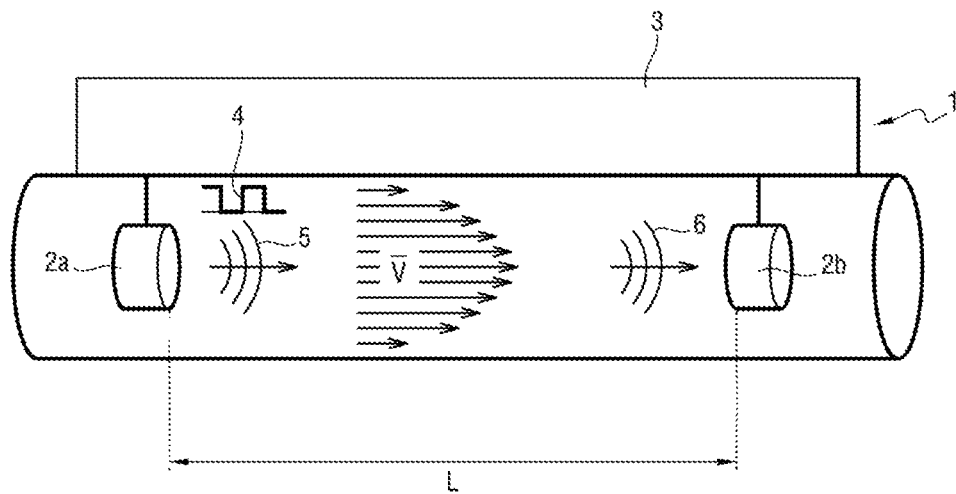
FIG. 1 represents an ultrasonic flow meter of the prior art.
Figure 2:
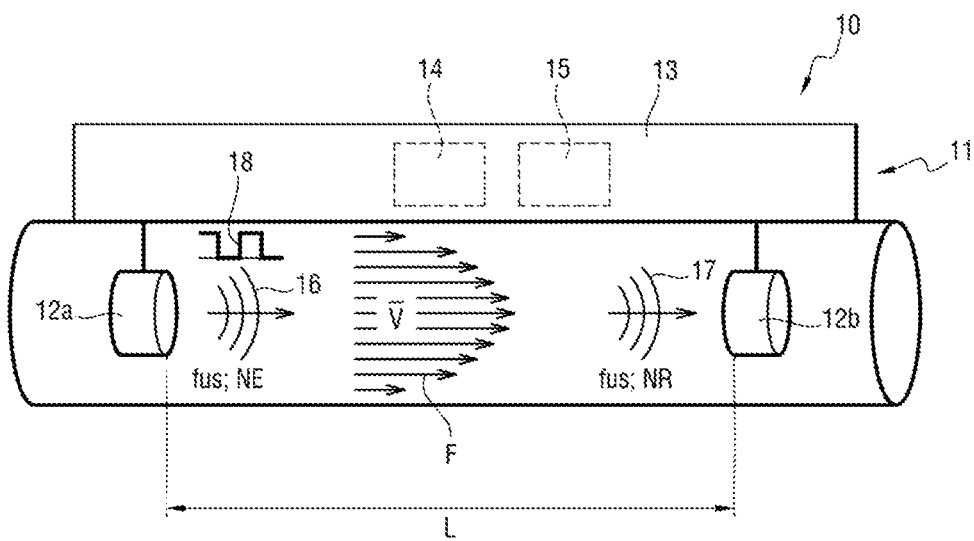
FIG. 2 represents an ultrasonic flow meter in which the method for measuring a fluid velocity in accordance with the invention is carried out.

With reference to FIG. 2, the method for measuring a velocity of a fluid in accordance with the invention is carried out here in an ultrasonic water meter 10.

The ultrasonic water meter 10 comprises a conduit in which water supplied by a distribution network of a facility is moving, as well as a device 11 for measuring the velocity of the water.

The water moves in the conduit from upstream to downstream, as indicated by the direction of the arrows F, but could also in fact move from downstream to upstream.

The measuring device 11 comprises a first transducer 12a, a second transducer 12b, and a measuring module 13 connected to the first transducer 12a and to the second transducer 12b.

The first transducer 12a and the second transducer 12b are paired. The first transducer 12a and the second transducer 12b are piezoelectric transducers in this case.

The measuring module 13 comprises a processing component 14 which is suitable for executing instructions of a program in order to carry out the measuring method in accordance with the invention. The processing component 14 in this case is a microcontroller, but it could be a different component, for example an ASIC (Application Specific Integrated Circuit) or FPGA (Field-Programmable Gate Array) type programmable logic circuit.

The measuring module 13 also comprises an analogue to digital converter 15 (optionally integrated into the processing component 14).

The measuring module 13 controls the first transducer 12a and the second transducer 12b.

The first transducer 12a and the second transducer 12b each function, in succession, as an emitter of emitted ultrasonic measuring signals 16, and as a receiver of received ultrasonic measuring signals 17.

The measuring module 13 generates an electrical excitation signal 18 and supplies the electrical excitation signal 18 to the emitter.

The emitter transforms the electrical excitation signal 18 into an emitted ultrasonic measuring signal 16. The measuring module 13 acquires the received ultrasonic measuring signal 17 which is received by the receiver.

The electrical excitation signal 18 has a frequency fus and period Tus. The frequency fus is conventionally in the range 900 kHz to 4 MHz and here (in the case in which the fluid is water), it is equal to 2 MHz. In the case in which the fluid is a gas, the frequency fus is conventionally of the order of a few tens of KHz.

The emitted ultrasonic measuring signal 16 therefore travels between the first transducer 12a and the second transducer 12b over a path of defined length L from upstream to downstream (then from downstream to upstream for the measurement in which the transducer 12b is emitting). The path of defined length here is a rectilinear path between the first transducer 12a and the second transducer 12b.

As was seen above, the mean velocity $\overline{V}$ of the fluid can be determined by using the formula:

$DToF = 2L \cdot \overline{V}/(C^2 - \overline{V}^2)$, in which C is the velocity of an ultrasonic wave in the fluid.

However, C depends on the temperature of the fluid.

It can be shown that the velocity $\overline{V}$ of a fluid can also be expressed by means of a formula which eliminates C, and thus which does not require the temperature of the fluid to be measured:

$$\overline{V} = 2L \cdot DToF/SumToF^2 - DToF^2$$

in which SumToF is the sum of the times of flight, which is obtained from the times of flight $ToF_{AB}$ and $ToF_{BA}$.

Thus, the times of flight $ToF_{AB}$ and $ToF_{BA}$ are determined in order to calculate SumToF and DToF.

FIG. 2 shows the first transducer 12a functioning as an emitter and the second transducer 12b functioning as a receiver. The electrical excitation signal 18 is thus applied to the input to the first transducer 12a in order to emit the emitted ultrasonic measuring signal 16. The emitted ultrasonic measuring signal 16 thus travels over the path of defined length L from upstream to downstream. The emitted ultrasonic measuring signal 16 is emitted by the emitter with a level of NE. The received ultrasonic measuring signal is received by the receiver with a level of NR which is lower than the level NE.

The measuring module 13 acquires the received ultrasonic measuring signal 17 after it has travelled in the water over the path of the defined length. The measuring module 13 digitizes the received ultrasonic measuring signal 17 by using the analogue to digital converter 15, and produces the measurement samples. For a signal with frequency fus=2 MHz, the sampling frequency is typically 8 MHz in order to comply with the Shannon sampling criterion.

Figure 3:
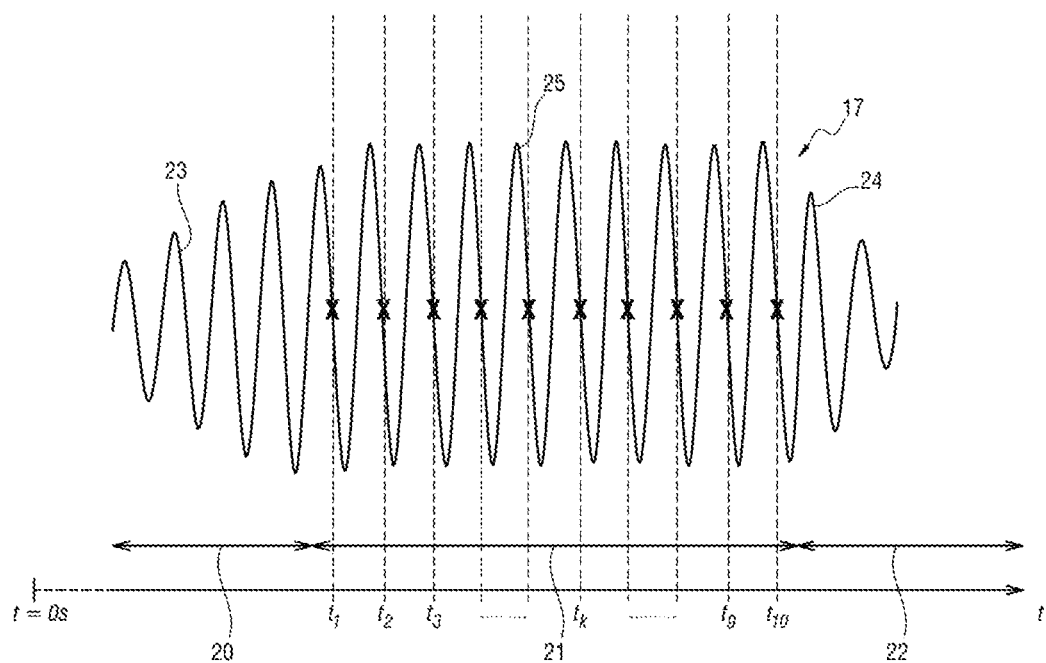
FIG. 3 represents an ultrasonic measuring signal after it has travelled in the fluid over a path with a predefined length.

The received ultrasonic measuring signal 17 can be seen in FIG. 3.

The received ultrasonic measuring signal 17 comprises, in succession, a preliminary zone 20, a measurement zone 21 and a final zone 22.

The preliminary zone 20 corresponds to a zone in which the frequency of the emitted ultrasonic measuring signal 16 is not yet precisely equal to the frequency fus of the electrical excitation signal 18. The frequency of the received ultrasonic measuring signal 17 is thus not yet precisely locked onto that of the electrical excitation signal 18, but rather, corresponds to the resonance frequency of the piezoelectric. The preliminary zone 20 in this case comprises four preliminary lobes 23. Here, the term "lobe" means a positive half-period of the received ultrasonic measuring signal 17.

The final zone 22 corresponds to a portion of the received ultrasonic measuring signal 17 which, prior to its reception by the receiver, has passed through metallic zones of the meter 10. The final zone 22 corresponds to the phenomenon known as "multipath". In the final zone 22, the received ultrasonic measuring signal 17 is rendered noisy by the multipaths. Here, the final zone 22 comprises two final lobes 24.

In contrast, in the measurement zone 21, the frequency of the received ultrasonic measuring signal 17 is properly equal to the frequency fus. The measurement zone 21 comprises ten measurement lobes 25.

The preliminary zone 20 and the final zone 22 are not taken into account, in order to improve the precision of the measurement of the fluid velocity.

Thus, the preliminary lobes 23 and the final lobes 24 are eliminated.

A zero crossing point $t_k$ may be associated with each measurement lobe 25. The measurement zone 21 comprises N zero crossing points which are termed $t_k$, in which k=1 to N. In this case, N=10.

The zero crossing point $t_k$ associated with a measurement lobe 25 is the moment when the descending front of the measurement lobe 25 passes through zero.

The zero crossing points of the measurement zone 21 which are selected are those which satisfy a predefined precision criterion. The selection is carried out in the following manner.

Figure 4:
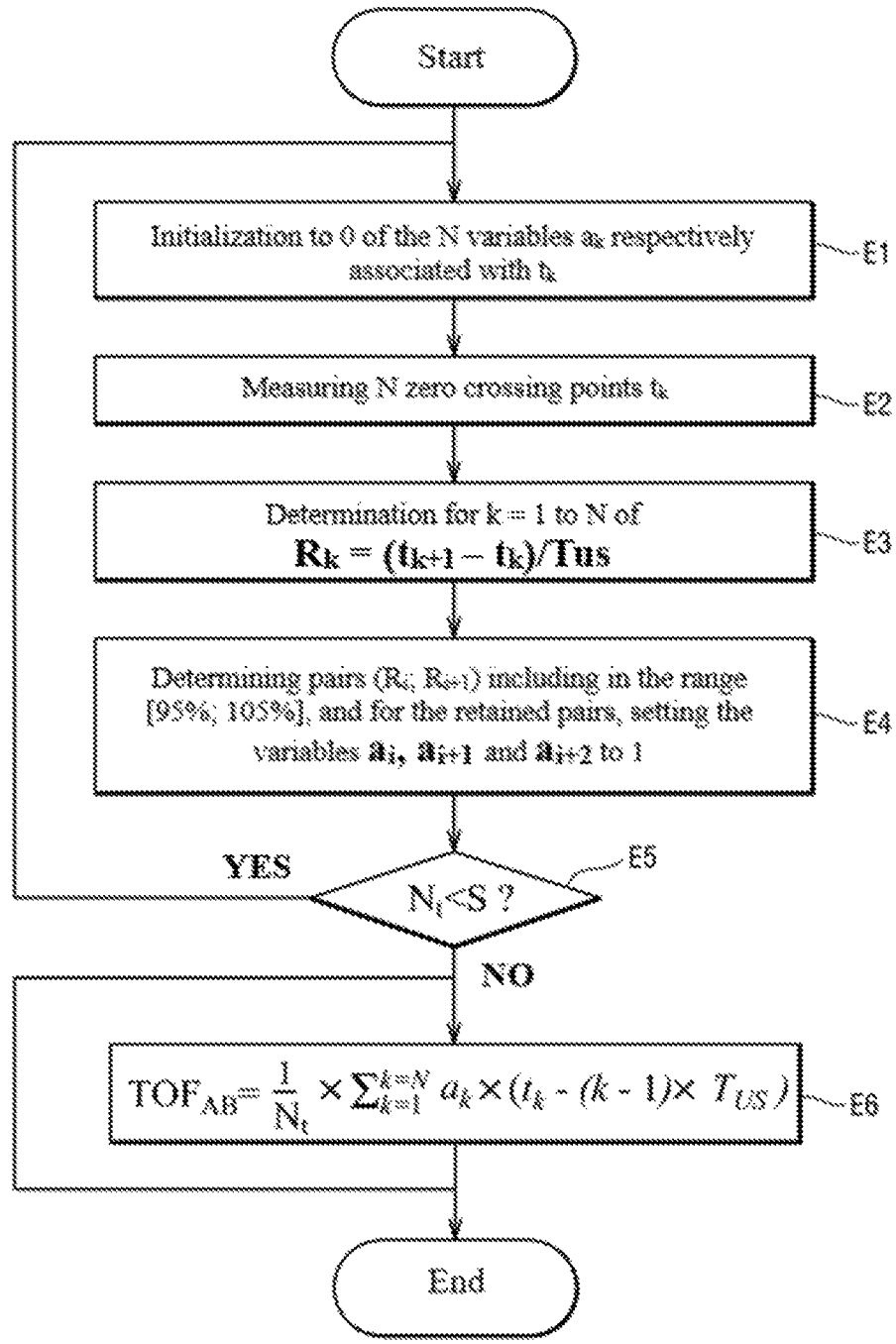
FIG. 4 represents the steps in the method in a fluid in accordance with the invention for measuring a velocity.

Referring to FIG. 4, N variables $a_k$ are defined, with k varying from 1 to N. The value of each variable $a_k$ is initialised to 0. Each variable $a_k$ is associated with a zero crossing point $t_k$ (step E1).

Thus, N zero crossing points N are measured. The zero crossing points are measured using a method of the "zero crossing" type which utilizes a sinusoidal interpolation carried out on the measurement samples of each measurement lobe 25 (step E2).

Next, at least two zero crossing points $t_i$ are selected which satisfy the predefined precision criterion. Thus, on the basis of the selected zero crossing points, correct measurement samples are defined which can be used to obtain an estimation of the fluid velocity which is sufficiently precise because incorrect measurements $t_k$ have been eliminated.

The predefined precision criterion utilizes a value for a ratio between a difference between two successive zero crossing points $t_k$, and between the period Tus of the electrical excitation signal 18 used to generate the emitted ultrasonic measuring signal 16.

More precisely, for k varying from 1 to N−1, values $R_k$ are calculated which are defined by:

$$R_k=(t_{k+1}-t_k)/Tus \qquad \text{(step E3)}.$$

Then, for k varying from 1 to N−1, couples $C_k=(R_k; R_{k+1})$ are searched for which are such that $$R_k \in [(100-\alpha)\%;(100+\alpha)\%] \text{ and } R_{k+1} \in [(100-\alpha)\%;(100+\alpha)\%],$$

in which α is a predefined precision threshold.

Here, α=5%.

The predefined precision threshold α is programmable. It is also possible to have two different predefined threshold values, one value to define the lower limit and the other to define the upper limit of the range of precision.

Thus, we start with k=1, then with k=2, ..., up to k=N−1, and all of the pairs $C_i=(R_i, R_{i+1})$, are identified for which:

$$R_i \in [95\%;105\%] \text{ and } R_{i+1} \in [95\%;105\%].$$

For each couple $C_i$ which satisfies these conditions, zero crossing points $t_i$, $t_{i+1}$ and $t_{i+2}$ are selected.

The variables $a_i$, $a_{i+1}$ and $a_{i+2}$ are then set to 1 (step E4).

This is continued until all of the correct zero crossing point measurements $t_i$ have been selected.

This then produces a number $N_t$ of selected zero crossing points $t_i$.

In a variation of step E4, all of the $R_i \in [95\%; 105\%]$ are selected, and for each of these $R_i$, the zero crossing points $t_i$ and $t_{i+1}$ are selected and then the variables $a_i$ and $a_{i+1}$ are set to 1.

Next, the number $N_t$ is compared with a predetermined rejection threshold S (step E5).

S is such that:

$$1 < S \leq N.$$

If $N_t < S$, this means that the set of zero crossing points $t_1, \ldots, t_N$ does not contain enough sufficiently precise zero crossing points. The predefined precision criterion has not been satisfied. The measurement samples of the received ultrasonic measuring signal 17 cannot be used to obtain a precise estimate of the velocity, for example because the ultrasonic measuring signal has been disrupted while travelling along the path with a predefined length.

The measurement is recommenced by returning to step E1.

If $N_t \geq S$, the predefined precision criterion has been satisfied.

The instantaneous point of the measurement of the time of flight $ToF_{AB}$ is determined by averaging the $N_t$ selected zero crossing points reduced to the instantaneous point $t_1$. The estimation of the time of flight $ToF_{AB}$ is obtained as follows:

$$ToF_{AB} = \frac{1}{N_t} \cdot \sum_{k=1}^{k=N} a_k \cdot (t_k - (k-1) \cdot T_{us}) \qquad \text{(step E6)}$$

Thus, non-linear filtering and linear filtering has been carried out. The non-linear filtering corresponds to the selection of the zero crossing points: the selection has no linearity with time. In turn, the linear filtering is carried out by averaging the selected zero crossing points in order to estimate the time of flight $ToF_{BA}$.

Next, the operations which have just been described are recommenced in order to determine the time of flight $ToF_{BA}$.

The electrical excitation signal 18 is thus applied to the input to the second transducer 12b in order to emit the emitted ultrasonic measuring signal. The emitted ultrasonic measuring signal thus travels over the path of defined length L from downstream to upstream. The received ultrasonic measuring signal is received by the first transducer 12a.

The measuring module 13 determines the time of flight $ToF_{BA}$ in the same manner as the time of flight $ToF_{AB}$ was determined.

Next, the total sum of the times of flight SumToF_tot is calculated as follows:

$$\text{SumToF\_tot} = ToF_{AB} + ToF_{BA},$$

and the sum of the times of flight SumToF by subtracting from the total sum of the times of flight SumToF_tot the activation times $TA_A$, $TA_B$ and the reception times $TR_A$, $TR_B$ which were determined during the calibration of the measuring device 11.

It is also possible to deduce therefrom the differential time of flight DToF by calculating the difference $ToF_{BA} - ToF_{AB}$.

In this manner, the velocity of the fluid in the tube is determined.

Clearly, the invention is not limited to the embodiment described, but encompasses any variations which fall within the scope of the invention as defined by the claims.

The invention is applicable irrespective of the positioning and configuration of the first transducer and the second transducer. The ultrasonic measuring signals may be emitted with an orientation at any angle with respect to a longitudinal axis of the conduit. The ultrasonic measuring signals may be reflected by reflectors, for example by mirrors orientated at 45°.

The fluid for which the velocity and the flow rate are measured is not necessarily water, but could be oil, gas, etc., for example.

The invention claimed is:

1. A method for measuring a velocity of a fluid, comprising the steps of:
   acquiring an ultrasonic measuring signal after it has travelled in the fluid over a path of defined length;
   defining a measurement zone of the ultrasonic measuring signal which includes a plurality of measurement lobes;
   for each measurement lobe, measuring a zero crossing point ($t_k$) associated with said measurement lobe;
   selecting at least two zero crossing points which satisfy a predefined precision criterion;
   estimating a time of flight for the ultrasonic measuring signal from the selected zero crossing points;
   utilizing the time of flight to estimate the velocity of the fluid.

2. The measuring method as claimed in claim 1, wherein the selected zero crossing points are successive zero crossing points which are associated with successive measurement lobes.

3. The measuring method as claimed in claim 2, wherein the predefined precision criterion utilizes a value for a ratio between a difference between two successive zero crossing points and between a period (Tus) of an electrical excitation signal used to generate the ultrasonic measuring signal.

4. The measuring method as claimed in claim 3, wherein the selection step comprises the steps of:
   for k=1 to N−1, calculating the values $R_k$ which are defined by:

$$R_k=(t_{k+1}-t_k)/Tus,$$

$t_k$ being the zero crossing points for the measurement zone, and Tus being the period of the electrical excitation signal;

when a pair $C_i=(R_i, R_{i+1})$ is such that:

$R_i \in [(100-\alpha)\%;(100+\alpha)\%]$ and $R_{i+1} \in [(100-\alpha)\%; (100+\alpha)\%]$, in which α is a predefined precision threshold, selecting the zero crossing points $t_i$, $t_{i+1}$ and $t_{i+2}$.

5. The measuring method as claimed in claim 4, wherein the selection step further comprises the steps of:

defining variables $a_k$, k varying from 1 to N;

initializing each variable $a_k$ to 0;

giving the value 1 to each variable $a_i$ when the zero crossing point $t_i$ is selected;

evaluating the time of flight from the formula:

$$ToF_{AB} = \frac{1}{N_t} \cdot \sum_{k=1}^{k=N} a_k \cdot (t_k - (k-1) \cdot T_{us}),$$

$N_t$ being the number of selected zero crossing points.

6. The measuring method as claimed in claim 1, in which the ultrasonic measuring signal comprises, in succession, a preliminary zone, the measurement zone and a final zone, the preliminary zone and the final zone not being taken into account in order to carry out the measurement of the velocity of the fluid.

7. An ultrasonic flow meter which comprises a first transducer, a second transducer and a measuring module connected to the first transducer and to the second transducer, the ultrasonic flow meter being configured to carry out the measuring method as claimed in claim 1.

8. A non-transitory computer program comprising instructions for executing the measuring method, by means of a microcontroller of the ultrasonic flow meter as claimed in claim 7.

9. A non-transitory storage medium, wherein the non-transitory storage medium stores a computer program which comprises instructions for executing, by means of a microcontroller of an ultrasonic flow meter, the measuring method as claimed in claim 1.

* * * * *